United States Patent [19]
Tsubakihara

[11] Patent Number: 6,004,022
[45] Date of Patent: Dec. 21, 1999

[54] PRODUCT SUM OPERATION APPARATUS

[75] Inventor: Masahiro Tsubakihara, Kanagawa, Japan

[73] Assignee: NEC Corporation, Tokyo, Japan

[21] Appl. No.: 08/882,490

[22] Filed: Jun. 25, 1997

[30] Foreign Application Priority Data

Jun. 27, 1996 [JP] Japan ................................ 8-167379

[51] Int. Cl.$^6$ .................................................. G06F 7/52
[52] U.S. Cl. .............................. 364/760.01; 364/760.02; 364/760.03; 364/760.04; 364/760.05; 364/724.19; 364/750.5; 364/716.02; 364/787.01; 395/800.38
[58] Field of Search ............................. 364/700, 724.19, 364/765, 750.5, 736.02, 228.6, 221.9, 231.8, 787.01, 716.02, 760.01, 760.03, 715.03, 764, 760.04, 760.05; 395/598, 569, 800.38

[56] References Cited

U.S. PATENT DOCUMENTS

| | | | |
|---|---|---|---|
| 5,220,559 | 6/1993 | Tsuzuki et al. | 370/60 |
| 5,424,969 | 6/1995 | Yamada et al. | 364/750.5 |
| 5,475,630 | 12/1995 | Briggs et al. | 364/765 |

FOREIGN PATENT DOCUMENTS

| | | |
|---|---|---|
| 0 574 018 A1 | 12/1983 | European Pat. Off. . |
| 0 416 308 | 3/1991 | European Pat. Off. . |
| 0 529 755 | 3/1993 | European Pat. Off. . |
| 0 574 018 | 12/1993 | European Pat. Off. . |

OTHER PUBLICATIONS

"High speed multiply using a 5–way adder", pp. 315–317, IBM Technical Disclosure Bulletin, vol. 33, No. 6B, Nov. 1990.

by Hajime Iizuka, "Electronic Computer 2", 1990, pp. 24–35.

*Primary Examiner*—Reba I. Elmore
*Assistant Examiner*—McDievnel Marc
*Attorney, Agent, or Firm*—Young & Thompson

[57] ABSTRACT

A product sum operation apparatus in which an increase in the circuit scale of the product sum operation apparatus can be suppressed and the operation speed can be increased even when the number of bits to be operated is increased. A partial product generating circuit has a partial product operation circuit of 12 bits×24 bits structure. A multiplier is divided into a lower digit multiplier of lower 12 bits and an upper digit multiplier of upper 12 bits. The partial product generating circuit receives sequential outputs from each of the lower digit multiplier and upper digit multiplier to generate corresponding lower digit partial products and upper digit partial products. An adder circuit adds the lower digit partial products, and the results of addition are temporarily held in a register of 48 bits structure. The adder circuit adds the lower digit addition results delivered out of the register, the results of upper digit addition of the upper digit partial products and an augend/minuend to generate a product sum operation result.

6 Claims, 4 Drawing Sheets

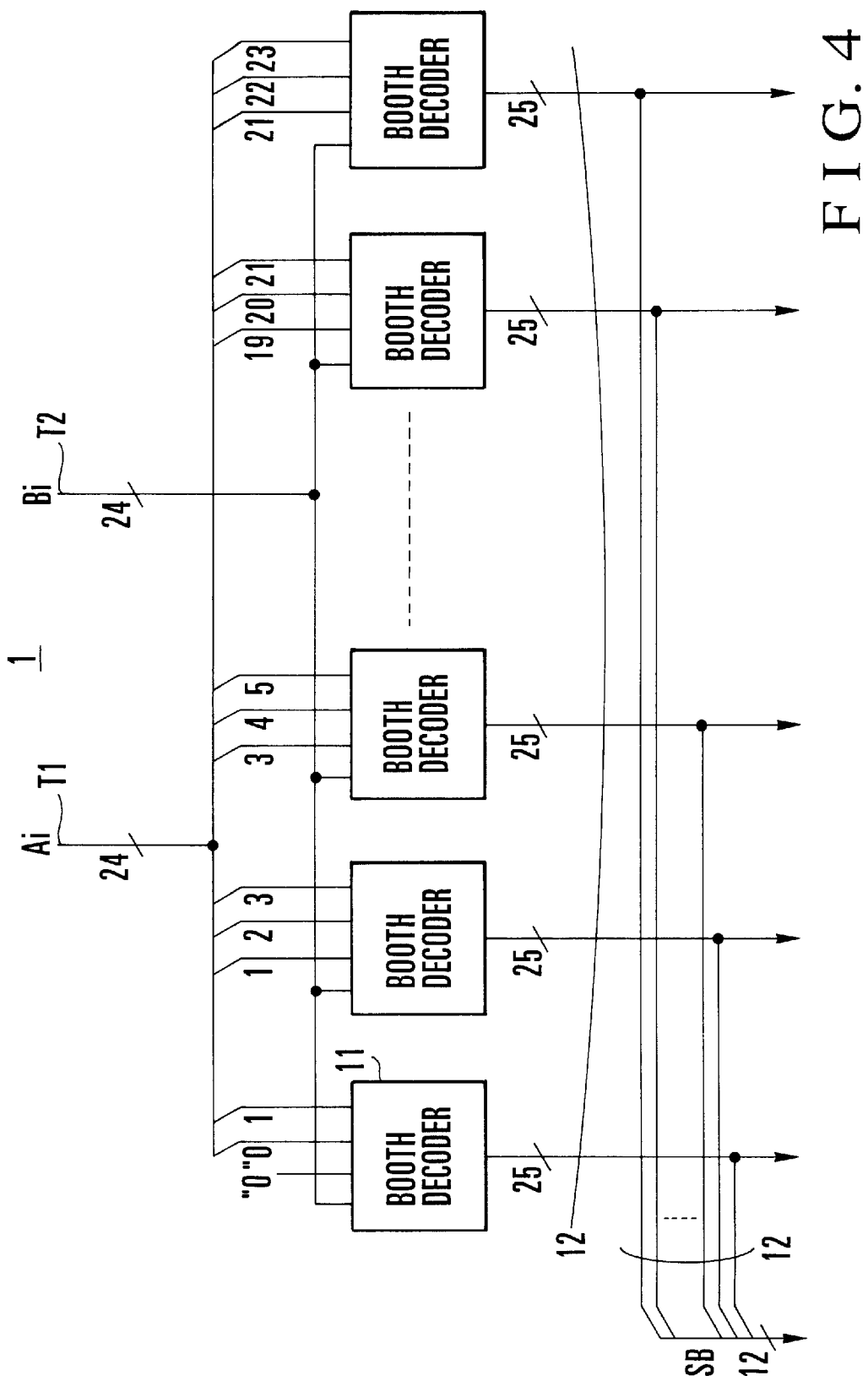
F I G. 4

PRODUCT SUM OPERATION APPARATUS

BACKGROUND OF THE INVENTION

The present invention relates to product sum operation processing apparatus and more particularly to a product sum operation processing apparatus generally used for multiplication of digital numbers with signs.

The product sum operation is indicated by the following formula:

$$Y = C \pm (Ai \times Bi) \qquad (1)$$

where Ai represents a multiplier, Bi represents a multiplicand, C represents an augend/minuend and Y a product sum operation result. Usually, either addition or subtraction is selected.

Conventionally, in order to perform multiplication at a high speed and with a small circuit scale so as to realize the above product sum operation, a technique which improves Booth coding, called improved Booth coding, has been used. The improved Booth coding is widely known as a high-speed multiplication method and is described in, for example, "Electronic Computer 2" by Hajime IIzuka, pp.31–33, Corona-sha, 1990. In the improved Booth algorithm, even digits j of a multiplier are picked up so that the multiplier may be divided by 3 bits which correspond to each digit j, the preceding digit j+1 and the succeeding digit j−1 to determine partial multipliers (PAi)j each being of 3 bits, the whole of a multiplicand is shifted in accordance with values of the individual partial multipliers to determine partial products (hereinafter referred to as sub-partial products) of the partial multipliers and the results of shift operation of the whole of the multiplicand, and the thus determined sub-partial products are mutually added to determine a result of multiplication (Ai×Bi). Since j is even, the number of partial multipliers (PAi)j is half the number of digits (or digit-1 for odd number) of the multiplier Ai.

Referring now to FIG. 3, a conventional product sum operation processing apparatus for execution of the above operation is illustrated in block diagram form. The conventional product sum operation processing apparatus has a partial product generating circuit 1 which receives a multiplier Ai from a multiplier input terminal T1 and a multiplicand Bi from a multiplicand input terminal T2 to generate partial products, a correction term generating circuit 2 which receives a sign bit SB of each of the partial products to generate a correction term of each sign, and an adder 3 which adds the partial products mutually to obtain a result of multiplication (Ai×Bi) and adds an augend/minuend C to the multiplication result (Ai×Bi) to deliver a product sum operation result Y.

The partial product generating circuit 1, based on Booth coding, is constructed as illustrated in block form in FIG. 4. As shown, the partial product generating circuit 1 has Booth decoders 11 which pick up even digits of the multiplier Ai to generate partial multipliers (PAi)j each having 3 bits corresponding to the even central digit, the preceding digit and the succeeding digit, generate sub-partial products of the partial multipliers (PAi)j and a multiplicand Bi and deliver sign bits SB of the individual sub-partial products. Thus, the Booth decoders 11 are identical in number to the partial multipliers (PAi)j.

Referring now to FIGS. 3 and 4, the operation of the conventional product sum operation apparatus will be described on the assumption that each of the multiplier Ai and the multiplicand Bi has 24 bits for convenience of explanation. Accordingly, the number of partial multipliers (PAi)j is 12 and the number of the Booth decoders 11 is 12. The partial product generating circuit 1 first receives the multiplier Ai inputted from the multiplier input terminal T1 and the multiplicand Bi inputted from the multiplicand input terminal T2, picks up even digits of the multiplier Ai to generate partial multipliers (PAi)j each having 3 bits corresponding to the even central digit, the preceding digit and the succeeding digit, and supplies the individual partial multipliers (PAi)j and the multiplicand Bi to the respective 12 Booth decoders 11 to cause them to operate in parallel, thus generating partial products based on the improved Booth decoding at a time.

Multiplication pursuant to the improved Booth decoding is indicated by the following equation:

$$P = -\sum_{j=0}^{\frac{n}{2}-1} S_j \cdot 2^{2j+n} + \sum_{j=0}^{\frac{n}{2}-1} P_j \cdot 2^{2j} \qquad (2)$$

where Sj represents sign bits of partial products and Pj represents sub-partial products.

In equation (2), the left term, that is, $$\sum_{j=0}^{\frac{n}{2}-1} P_j \cdot 2^{2j} \qquad (3)$$

indicates partial products delivered out of the partial product generating circuit, and the right term, that is, $$-\sum_{j=0}^{\frac{n}{2}-1} S_j \cdot 2^{2j+n} \qquad (4)$$

indicates sign correction terms.

Equation (4) can be reduced to the following equation (5) by using the nature of 2' complement:

$$S_{\frac{n}{2}-1} \cdot 2^{2n-2} + 2^{2n-3} + S_{\frac{n}{2}-2} \cdot 2^{2n-4} + \ldots S_2 \cdot 2^{n+2} + 2^{n+1} + S_0 \cdot 2^n + 2^n \qquad (5)$$

Gathering from equation (5), it will be seen that the sign correction term in multiplication of N bits×N bits can be determined from a sign bit of the most significant bit of each sub-partial product. The correction term generating circuit 2 generates sign correction terms CB from sign bits SB of the individual sub-partial products. Three kinds of data pieces including the partial products delivered out of the partial product generating circuit 1, the sign correction terms CB generated by the correction term generating circuit 2 and the augend/minuend C supplied from the augend/minuend input terminal T4 are added together at a time to perform a product sum operation and a product sum operation result Y is delivered to an output terminal T5.

In the conventional product sum operation processing apparatus, however, when a circuit for executing the above calculation formulae as they are is constructed, the circuit scale of the partial product generating circuit increases as the number of bits to be calculated increases and because of an increase in the number of partial products, the circuit scale of the adder also increases, with the result that the overall circuit scale is increased.

Specifically, when each of the multiplier Ai and the multiplicand Bi has 24 bits and the above calculation formulae as they are are simply executed with a circuit, the circuit has a large scale of 31440 transistors.

Thus, the aforementioned conventional product sum operation apparatus has disadvantages that the circuit scale of the partial product generating circuit is increased as the number of bits to be calculated increases and because of an increased number of partial products, the circuit scale of the adder is increased, giving rise to an increase in the overall circuit scale.

SUMMARY OF THE INVENTION

The present invention contemplates elimination of the above drawbacks and it is an object of the present invention to provide a product sum operation apparatus which can suppress the increase in the circuit scale even when the number of bits to be calculated increases.

According to the present invention, to accomplish the above object, in a product sum operation apparatus having a partial product generator for receiving a multiplier of N bits and a multiplicand of N bits and generating a plurality of partial products of the multiplier and the multiplicand and sign bits of the individual partial products, a correction term generator for receiving the sign bits and generating sign correction data necessary to perform sign correction for results of operation applied to the multiplier and the multiplicand, and an adder for receiving the partial products, the sign correction data and an augend/minuend and adding them together to deliver a product sum operation result, the product sum operation apparatus comprises holder means, the partial product generator means includes a partial product operation circuit of an N/2 bits×N bits structure, wherein either the multiplier or the multiplicand is divided into lower digit data of lower N/2 bits and upper digit data of upper N/2 bits and the partial product operation circuit receives sequential supplies of the lower digit data and the upper digit data to generate corresponding lower digit partial products and upper digit partial products, the holder has a 2N bits structure for temporarily holding lower digit addition results corresponding to the lower digit partial products subject to the addition processing by the adder, and the adder adds the lower digit addition results delivered out of the holder and upper digit addition results corresponding to the upper digit partial products to generate a product sum operation result.

BRIEF DESCRIPTION OF THE DRAWINGS

FIG. 4 is a block diagram showing the construction of a partial product generating circuit in FIG. 3.

DESCRIPTION OF THE PREFERRED EMBODIMENTS

Figure 1:
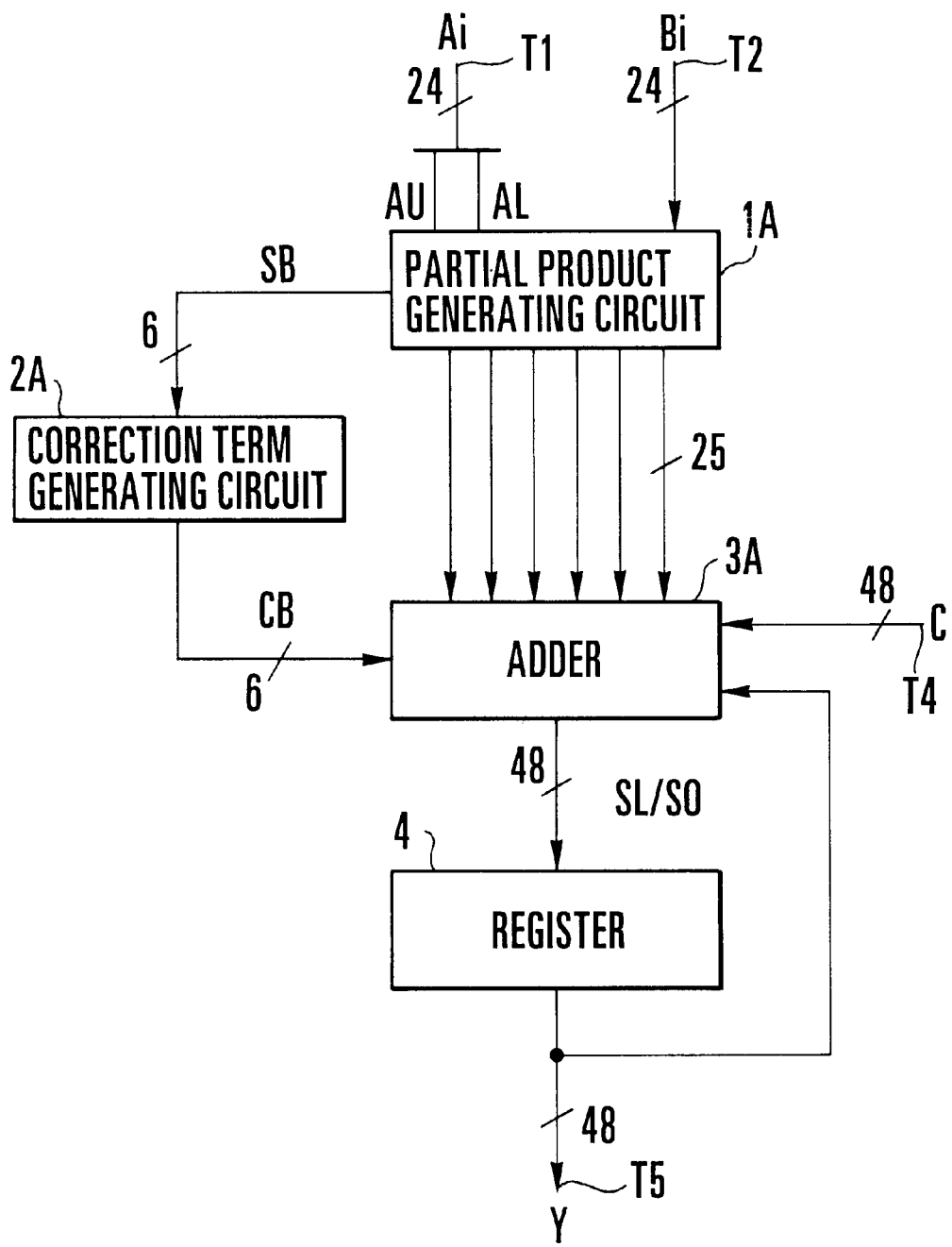
FIG. 1 is a block diagram showing an embodiment of a product sum operation apparatus of the present invention.
Figure 3:
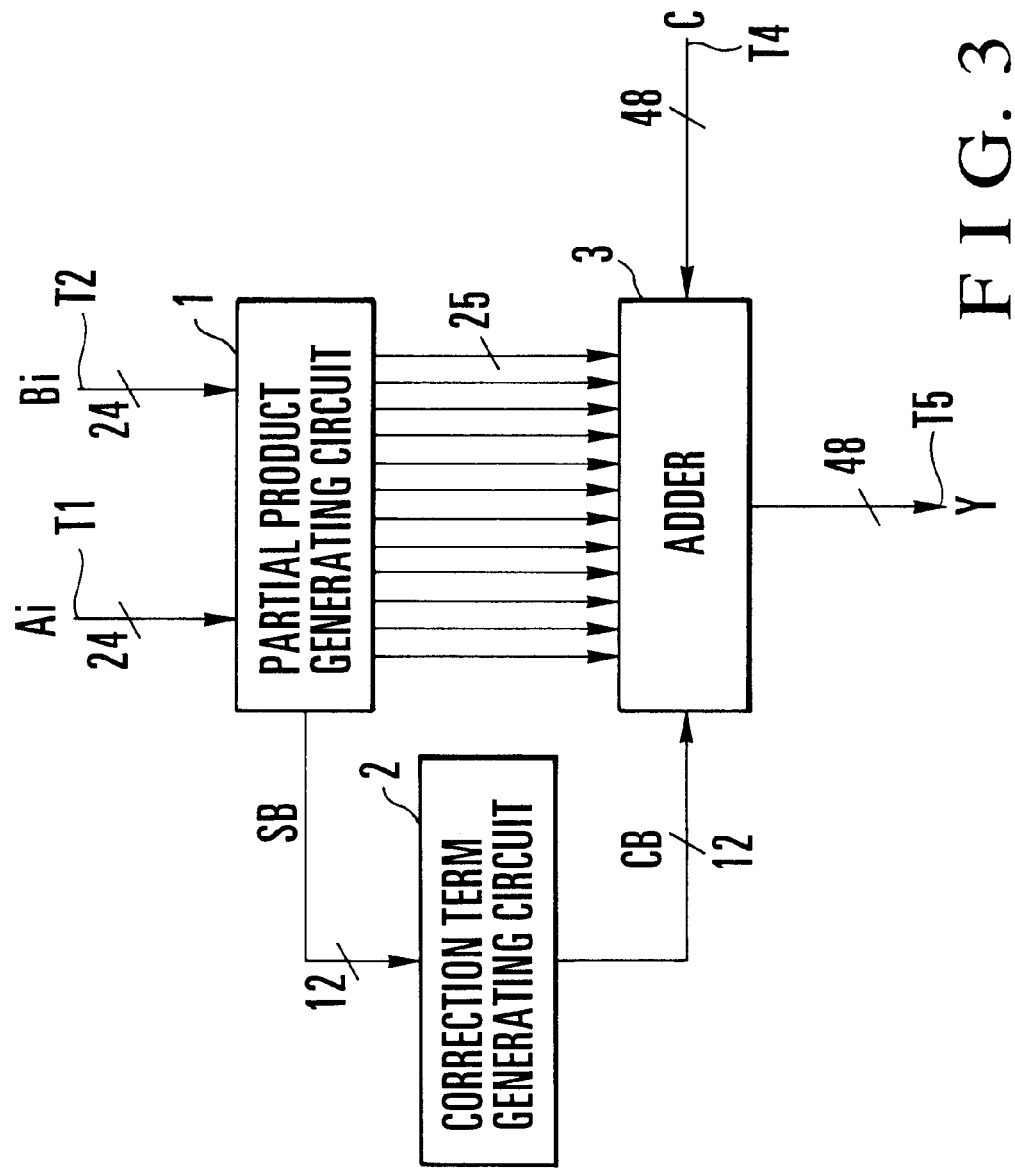
FIG. 3 is a block diagram shown an example of a conventional product sum operation apparatus.

Referring now to FIG. 1, an embodiment of the present invention will be described. A product sum operation apparatus according to the present embodiment is illustrated in block form in FIG. 1, having components similar to those of FIG. 3 which are designated by similar numerals. For convenience of explanation, the product sum operation apparatus according to the present embodiment is illustrated as receiving a multiplier Ai of 24 bits and a multiplicand of 24 bits like the conventional apparatus and it comprises a partial product generating circuit 1A for receiving two divisional supplies of an upper digit data string AU of 12 bits and a lower digit data string AL of 12 bits of the multiplier Ai and performing two partial product generating operations corresponding to the respective divisional supplies, a correction term generating circuit 2A for generating a correction term each time that each of the two partial product generating operations is performed, an adder 3A for performing addition each time that each of the two partial product generating operations is performed and delivering outputs SL and SO, and a register 4 for holding an output of the adder 3A generated during the first partial product generating operation.

Figure 2:
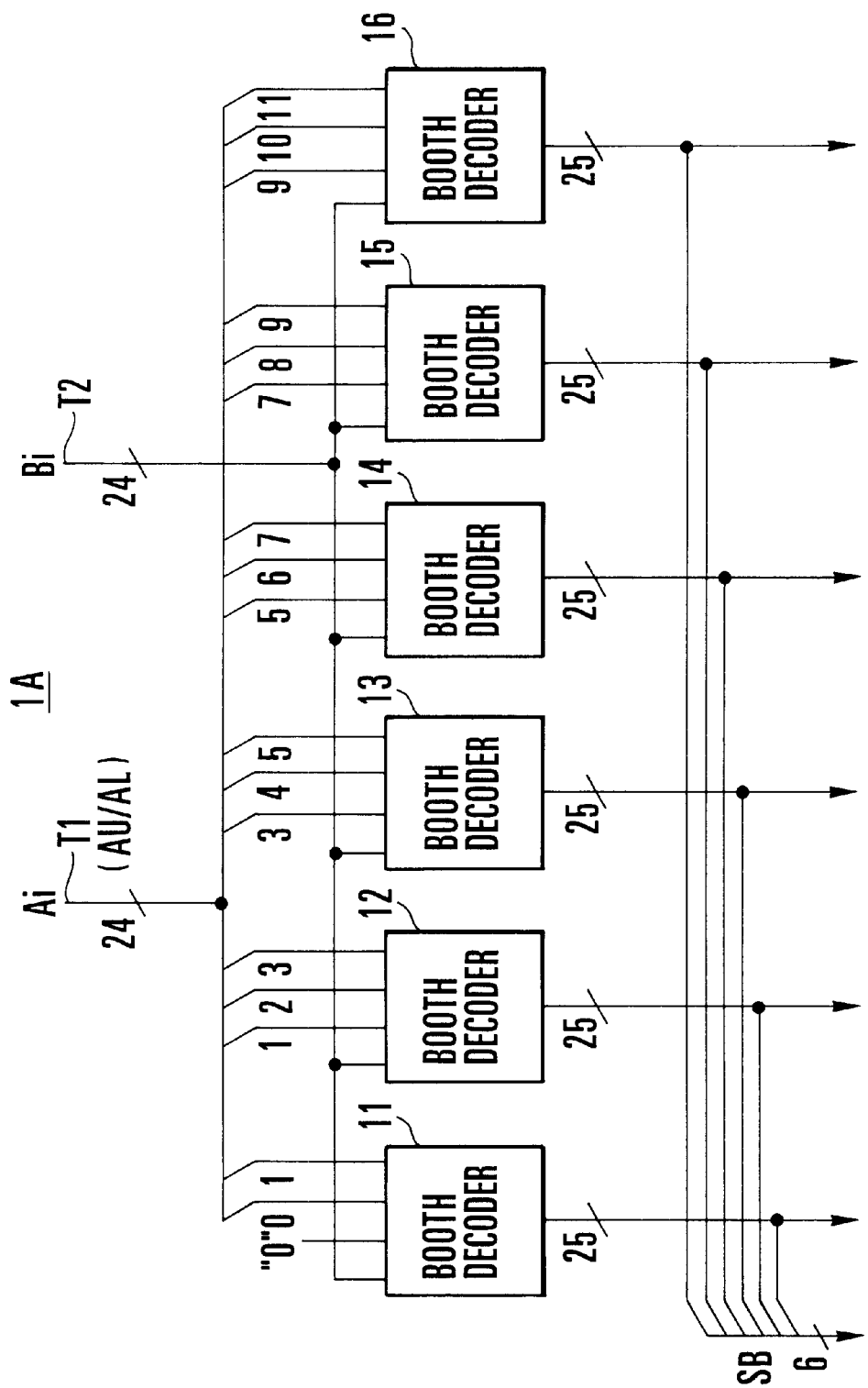
FIG. 2 is a block diagram showing the construction of a partial product generating circuit in FIG. 1.

Referring to FIG. 2 showing in block form the construction of the partial product generating circuit 1A based on the improved Booth coding, the partial product generating circuit 1A includes 6 Booth decoders 11 to 16 which pick up even digits of the multiplier Ai so as to generate sub-partial products of partial multipliers (PAi)j and the multiplicand Bi, each of the partial multipliers (PAi)j having 3 bits corresponding to the even central digit, the preceding digit and the succeeding digit and which deliver sign bits SB of the individual sub-partial products.

Referring now to FIGS. 1 and 2, the operation of the present embodiment will be described. Firstly, the multiplier Ai and the multiplicand Bi are inputted from the multiplier input terminal T1 and the multiplicand input terminal T2, respectively. At that time, a data string of 24 bits of the input multiplier Ai is divided into halves, of which one is a data string upper digit multiplier AU of upper 12 bits and the other is a data string lower digit multiplier AL of lower 12 bits and consequently, the 24-bit data string is inputted to the partial product generating circuit 1A through two divisional supplies.

Since each of the upper digit multiplier and the lower digit multiplier has 12 bits and so the number of partial multipliers (PAi)j is 6, corresponding 6 Booth decoders 11 to 16 are operated in parallel in the partial product generating circuit 1A to generate sub-partial products. Namely, it suffices that the number of the Booth decoders is ¼ of the bit number of the multiplier Ai or the multiplicand Bi. During the first calculation, operation is applied to the lower digit multiplier AL and the multiplicand Bi, the adder 3 adds the results of operation, a data string of lower 24 bits of the augend/minuend C of 48 bits inputted from the augend/minuend input terminal T4 and the sign correction terms CB generated by the correction term generating circuit 2 together, and an operation value SL representing the result of addition is held in the register 4 and is also delivered to the output terminal T5.

Subsequently, during the second calculation, operation is applied to the upper digit multiplier AU and the multiplicand Bi, and the adder 3 adds the operation value SL obtained through the first calculation and held in the register 4, sign correction terms CB generated by the correction term generating circuit 4 and a data string of upper 24 bits of the augend/minuend C together to obtain an output Y of product sum operation.

In the adder 3, addition is carried out by shifting results of multiplication of the upper digit multiplier AU by the multiplicand Bi by 12 bits towards upper digits. The sign correction values CB to be added during the second calculation are added after they are so modified as to coincide with sign correction values used for calculation of 24 bits×24 bits. This is because in the sign correction term of equation (5), $2^n$ is always added. In other words, in the present embodiment, during addition of the upper digit multiplier AU, $2^{36}$ ($=2^{6+12}$) is always added superfluously but $2^{37}$ ($=2^{(n+1)+12}$) is not added, so that accurate calculation value of 24 bits×24 bits cannot be obtained. During calculation of lower digit 12 bits×24 bits, however, sign correction terms identical to those during calculation of 24 bits×24 bits can be obtained and so the multiplication results are added together without being shifted.

As described above, in the product sum operation processing apparatus of the present embodiment, since the scale of the partial product generating circuit can be nearly halved and so the number of partial products to be calculated at a time can be halved, the scale of the adder can be nearly half the scale of the conventional adder, with the result that about 17270 transistors suffice in the present embodiment and the circuit scale can be reduced by about 45% of about 31440 transistors of the conventional 24 bits×24 bits structure apparatus.

Further, by virtue of the two addition operations of partial products, the amount of operations can be halved to improve the operation speed and the operating frequency can be increased. It is expected that the operation frequency is improved by about 30% of that in the conventional apparatus.

As described above, in the product sum operation apparatus of the present invention, the partial product generator means has the partial product operation circuit of N/2 bits×N bits structure whereby the partial product operation circuit receives sequential supplies of the lower digit data of N/2 bits and the upper digit data of N/2 bits to generate corresponding lower digit partial products and upper digit partial products, the product sum operation apparatus has the holder means of 2N bits structure for temporarily holding lower digit addition results, and the adder adds the lower digit addition results and the upper digit addition results corresponding to the upper digit partial products to generate the product sum operation result. With this construction, the scale of the partial product generating circuit can be nearly halved to halve the number of partial product operations to be carried out at a time and consequently, the scale of the adder can be nearly halved as compared to that of the conventional adder to thereby nearly halve the circuit scale to advantage.

In addition, the addition of partial products is divided into two operations to halve the amount of operation and advantageously, the operation speed can be improved to increase the operating frequency.

What is claimed is:

1. A product sum operation apparatus having partial product generating means for receiving a multiplier of N bits and a multiplicand of N bits and generating a plurality of partial products of the multiplier and the multiplication and sign bits of the individual partial products, correction term generating means for receiving the sign bits and generating sign correction data necessary to perform sign correction for results of operation applied to the multiplier and the multiplicand, and adder means for receiving the partial products, the sign correction data and an augend/minuend and adding them together to deliver a product sum operation result, said product sum operation apparatus comprising hold means, said partial product generating means including a partial product operation circuit of an N/2 bits×N bits structure, wherein either the multiplier or the multiplicand is divided into lower digit data of lower N/2 bits and upper digit data of upper N/2 bits and said partial product operation circuit receives sequential supplies of the lower digit data and the upper digit data to generate corresponding lower digit partial products and upper digit partial products, said hold means having a structure of 2N bits structure for temporarily holding lower digit addition results corresponding to the lower digit partial products subject to the addition processing by said adder means, and said adder means adding the lower digit addition results delivered out of said hold means and upper digit addition results corresponding to the upper digit partial products to generate a product sum operation result.

2. A product sum operation apparatus according to claim 1, wherein said correction term generating means generates sign correction data for the processing of N bits×N bits operation of said multiplier and said multiplicand.

3. A product sum operation apparatus according to claim 1, wherein said partial product generating circuit uses the improved Booth coding in which even digits of said multiplier are picked up to generate a plurality of partial multipliers each having an even central bit, the preceding bit and the succeeding bit, a shift operation is applied to the whole of said multiplicand in accordance with values of the individual partial multipliers to determine sub-partial products of said partial multipliers and results of the shift operation applied to the whole of said multiplicand, and said sub-partial products are added together.

4. A product sum operation apparatus according to claim 1 or 3, wherein said partial product operation circuit of said partial product generating means includes N/4 Booth decoders using the improved Booth coding.

5. A product sum operation apparatus comprising:

a partial product generating circuit having as an input an n bit multiplier and an n bit multiplicand, in which one of the multiplier and the multiplicand is divided into N/2 lower digit data and N/2 upper digit data, and comprising plural Booth decoders, each of said plural Booth decoders providing respective partial products of the other of the multiplier and the multiplicand with the lower digit data and with the upper digit data as lower digit partial products and upper digit partial products, respectively;

a correction term generating circuit connected to an output from said partial product generating circuit to receive sign correction data therefrom and having as an output a sign correction for the lower digit partial products and the upper digit partial products;

an adder having inputs connected to said partial product generating circuit to receive the lower digit partial products and the upper digit partial products from said plural Booth decoders, to the output from said correction term generating circuit to receive the sign correction, to an apparatus input to receive one of an augend and a minuend, and to an output from a register, said adder adding the lower digit partial products, the sign correction, and the one augend or minuend to provide an output to said register, said adder also adding the upper digit partial products, the sign correction, the one augend or minuend and an output from said register resulting from addition of the lower digit partial products to provide an output to said register;

said register being connected to said adder and temporarily holding an output from said adder resulting from addition of the lower digit partial products, whereby said register provides a product sum operation resulting from addition of the upper digit partial products, the sign correction, the one augend or minuend and the output from said register resulting from the lower digit partial products.

6. The product sum operation apparatus of claim 5, comprising N/4 of said Booth decoders.

* * * * *